May 20, 1924.

H. F. BIEDERMANN ET AL

SAW

Original Filed May 26, 1922

1,494,576

Witness;-
Wm. E. Seaver.

Inventors
H. F. Biedermann
C. E. Bridges
By Robb & Robb Hill
Attorneys

Patented May 20, 1924.

1,494,576

UNITED STATES PATENT OFFICE.

HUGO F. BIEDERMANN AND CHARLES E. BRIDGES, OF TUSCALOOSA, ALABAMA.

SAW.

Application filed May 26, 1922, Serial No. 563,837. Renewed February 18, 1924.

*To all whom it may concern:*

Be it known that we, HUGO F. BIEDERMANN and CHARLES E. BRIDGES, citizens of the United States, residing at Tuscaloosa, in the county of Tuscaloosa and State of Alabama, have invented certain new and useful Improvements in Saws, of which the following is a specification.

The present invention appertains to improvements in saws and it has for its object to provide a novel form and arrangement of teeth whereby the material operated upon will be given a substantially smooth finish.

Roughness and splintering of the face of lumber have always been characteristic of the work produced by the conventional types of saws in use at the present time and it has long been the aim and desire of sawmill men to eliminate this undesirable appearance as much as possible.

By much experimentation we have accomplished the desired result by the use of the unique arrangement of the saw teeth such that the leading teeth cut into the wood with a planing action while following teeth provide for the necessary clearance.

Figure 1:
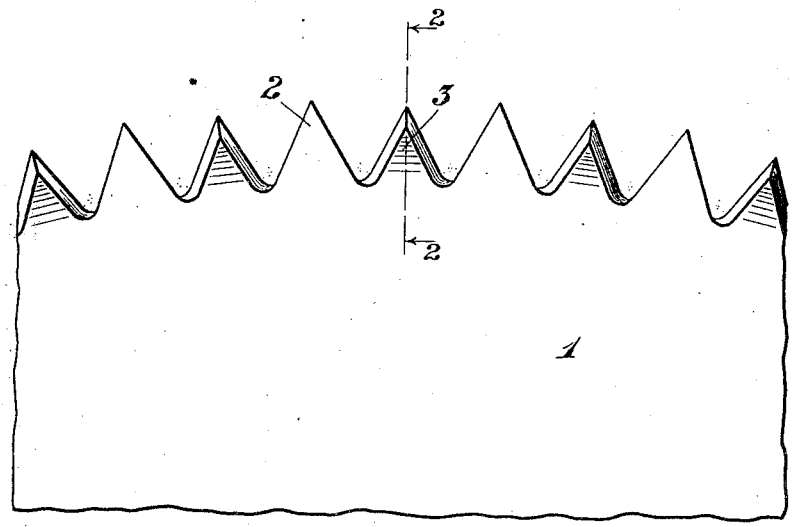
Figure 1 is a fragmentary view in elevation of a circular cut-off saw provided with our special form of teeth.
Figure 2:
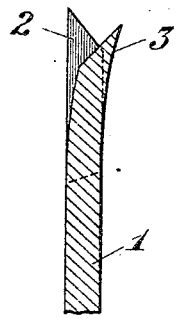
Figure 2 is a sectional view on the line 2—2 of Figure 1, looking in the direction of the arrows.

Referring to the drawing, 1 designates the body of the saw, which in this instance is a circular cut-off saw. The saw is provided with two types of teeth, alternating in arrangement, those indicated at 2 and those designated 3. The teeth 2 are longer than the teeth 3. The teeth 2 have their edges beveled correspondingly to the edges of the teeth 3 but at opposite sides of the saw from the beveled edges of the latter.

The important feature of the construction of the teeth is that the long ones are straight or without any set, while the short ones are given a sufficient set to provide for the required clearance. The straight long side of the teeth 3 runs next to the material operated upon, cutting ahead of the shorter teeth, and the effect of this is that the longer teeth cut a clean face leaving no saw marks, broken or "fuzzy" edges, the set teeth following and loosening the grains of the wood in the natural way. This arrangement of the long teeth furthermore acts to steady the blade in its operation and this enhances the smoothness of the finish in an obvious manner.

While we have shown this idea as applied to a circular cut-off saw, it is to be understood that it is within the purview of this invention to incorporate the same principle in saws of different types and, therefore, we do not wish to be limited in this regard.

Having thus described our invention, what we claim as new and desire to secure by Letters Patent is:

1. A saw construction having a series of straight teeth and a series of shorter teeth offset from the plane of the saw to effect a clearance while the straight cutting teeth balance the lead off due to the offset.

2. A saw construction having a series of relatively long and straight teeth and a series of relatively shorter teeth provided with a set to one side of the saw to effect a clearance while the straight cutting teeth balance the lead off due to the offset.

3. A saw construction having a series of straight teeth and a series of offset teeth, the teeth of one series differing in length from the teeth of the other series whereby the lead off of the offset teeth is balanced by the straight teeth.

In testimony whereof we affix our signatures.

HUGO F. BIEDERMANN.
CHARLES E. BRIDGES.